(12) United States Patent
White et al.

(10) Patent No.: US 11,874,848 B2
(45) Date of Patent: Jan. 16, 2024

(54) AUTOMATED DATASET PLACEMENT FOR APPLICATION EXECUTION

(71) Applicant: EMC IP Holding Company LLC, Hopkinton, MA (US)

(72) Inventors: William Jeffery White, Plano, TX (US); John S. Harwood, Boston, MA (US); Robert Anthony Lincourt, Jr., Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 193 days.

(21) Appl. No.: 17/460,487

(22) Filed: Aug. 30, 2021

(65) Prior Publication Data

US 2023/0062354 A1 Mar. 2, 2023

(51) Int. Cl.
*G06F 16/21* (2019.01)
*G06F 16/23* (2019.01)
*G06F 16/25* (2019.01)
*G06F 16/27* (2019.01)

(52) U.S. Cl.
CPC .......... *G06F 16/258* (2019.01); *G06F 16/214* (2019.01); *G06F 16/2365* (2019.01); *G06F 16/2379* (2019.01); *G06F 16/278* (2019.01)

(58) Field of Classification Search
None
See application file for complete search history.

(56) References Cited

U.S. PATENT DOCUMENTS

| 8,327,102 | B1 * | 12/2012 | Palsule | G06F 3/0647 |
| | | | | 711/165 |
| 10,521,124 | B1 * | 12/2019 | Aharoni | G06F 3/0631 |
| 10,896,236 | B2 * | 1/2021 | Parker | G06F 16/955 |
| 2013/0297869 | A1 * | 11/2013 | Mills | G06F 3/0689 |
| | | | | 711/112 |
| 2019/0205034 | A1 * | 7/2019 | Mueller-Wicke | G06F 3/0608 |
| 2020/0364190 | A1 * | 11/2020 | Das | G06F 16/2246 |
| 2021/0349657 | A1 * | 11/2021 | Darji | G06F 3/0679 |
| 2022/0035799 | A1 * | 2/2022 | Bhutada | G06F 40/30 |

OTHER PUBLICATIONS

Nastic, Stefan, et al., "Polaris Scheduler: Edge Sensitive and SLO Aware Workload Scheduling in Cloud-Edge-IoT Clusters," 2021 IEEE 14th International Conference on Cloud Computing (CLOUD), Sep. 5, 2021, Chicago, IL, USA, pp. 206-216. (Year: 2021).*

* cited by examiner

*Primary Examiner* — Scott A. Waldron
(74) *Attorney, Agent, or Firm* — Chamberlain, Hrdlicka, White, Williams & Aughtry; Aly Z. Dossa (57) ABSTRACT

Techniques described herein relate to a method for distributed data management. The method may include obtaining data descriptors for an application executing on a data host, performing a dataset policy analysis using the data descriptors to determine a data placement for a dataset associated with the application using a global name repository, performing, based on the data policy analysis, the data placement, and based on the data placement, updating the global name repository.

20 Claims, 6 Drawing Sheets

AUTOMATED DATASET PLACEMENT FOR APPLICATION EXECUTION

BACKGROUND

Computing devices often exist in complex ecosystems of devices in which data exists and/or is generated. Such data may be used and/or operated on to produce any number of results. Additionally, such data may be produced and stored by any device within the ecosystem, and the amount of data items produced and stored locally by such devices may be vast. Therefore, techniques are required for understanding such data.

SUMMARY

In general, certain embodiments described herein relate to a method for distributed data management. The method may include obtaining data descriptors for an application executing on a data host, performing a dataset policy analysis using the data descriptors to determine a data placement for a dataset associated with the application using a global name repository, performing, based on the data policy analysis, the data placement, and based on the data placement, updating the global name repository.

In general, certain embodiments described herein relate to a non-transitory computer readable medium that includes computer readable program code, which when executed by a computer processor enables the computer processor to perform a method for distributed data management. The method may include obtaining data descriptors for an application executing on a data host, performing a dataset policy analysis using the data descriptors to determine a data placement, for a dataset associated with the application using a global name repository, performing, based on the data policy analysis, the data placement, and based on the data placement, updating the global name repository.

In general, certain embodiments described herein relate to a system for using pipeline data for distributed data management. The system may include an application controller, executing on a processor comprising circuitry. The application controller may be configured to: obtain data descriptors for an application executing on a data host, perform a dataset policy analysis using the data descriptors to determine a data placement for a dataset associated with the application using a global name repository, initiate, based on the data policy analysis, the data placement, and based on the data placement, update the global name repository.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art, who have the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems, and non-transitory computer readable mediums storing instructions for deploying applications in a device ecosystem, and managing the placement of data based on the deployment of the applications. In one or more embodiments, a global name and metadata are stored with the data, published to a global name repository, and used while performing the placement of such data.

Data is often produced remotely by any number of ecosystems. As an example, multimedia sensor systems provide a very high volume of data to be processed in cognitive and analytics systems remote from data centers. Some estimates indicate that 175 Zettabytes of data will be produced by 2025 and that over 80% will be produced outside of cloud/core data centers. Data that is produced remotely is often difficult to insert into a data catalog and name space at the scale of edge systems. Additionally, many data catalogs are industry specific (e.g., healthcare genomics, autonomous driving, etc.) and few contemplate distributed ingest and processing of the data. This may lead to heuristic systems and distribution of cloud stacks to attempt to create distributed data frameworks. However, many cloud services may not properly operate in the edge of a device ecosystem. Remote data awareness, ingest, catalog and processing are often managed in a fragmented and organizationally specific manner.

Data that is produced at the edge of device ecosystems under existing frameworks often must be conditioned through a process to determine validity and applicability. The data may be moved from a collector capability and placed into file, object, steaming service, or database. The data may have to be sized appropriately and/or organized based on a sequential metric (e.g., time) or other metric, and placed into a file store directory structure, database, object store, etc. Many frameworks require different data types to be combined into a single data structure and associated with the sequential metric. Such processes are complex and often cumbersome with custom automation tools. As the data production moves to be predominantly on the edge of device ecosystems, the process may become unmanageable due to scale and complexity. Such unmanageability may be due to the changes in environment and/or limited process visibility which result in numerous process exceptions. One issue is a lack of visibility at a granular level to understand what data is produced, when, and by what entity.

Data is produced for a variety of purposes, but it is not always clear what process, service, application, etc. produced the data. Additionally, file/object name and/or the corresponding owner may not make clear the purpose of the data. As an example, data from a manufacturing facility could be produced for a variety of reasons (e.g., anomaly detection, random training data, etc.), but from a content perspective, be very similar. In one or more embodiments, intent and expectation of use is context sensitive and should be determined at time of production of the data. This may be difficult in distributed edge systems as the system may be computationally limited and/or not be connected to a network. Additionally, data production is often ephemeral.

In order to address, at least in part, the above-described problems with managing data generated in a device ecosystem, in one or more embodiments, monitor agents are distributed on computing devices where data is locally produced and/or stored. In one or more embodiments, such agents are in communication with a global policy manager. In one or more embodiments, the global policy manager distributes heuristic rules and machine learning (ML) classifiers to the monitor agent, each of which may be used to classify the intent (e.g., intended use) of data written where the agent is located.

In one or more embodiments, the monitor agent monitors the relevant storage of the host on which the agent is deployed to determine when data is written on the host (e.g., to a file system, object store, data streams, key-value databases, etc.). In one or more embodiments, when data is written, the monitor agent classifies the intent of the data, assigns a global name to the data, and generates metadata associated with the data. The intent of the data may be obtained through use of an application programming interface (API) used by the application writing the data to provide intent and other information about the data to the monitor agent.

Additionally or alternatively, when the monitor agent determines that data has been written, the monitor agent may use various techniques to gather information about the data, and to perform a classification of the data to obtain the intent (e.g., primary intent, most likely intent, etc.) of the data. In one or more embodiments, the classification is performed using a set of rules provided to the monitor agent by the global policy manager, with which the monitor agent attempts to classify the intent of the data. In one or more embodiments, the results of the intent classification and the information about the data are then provided to an ML classifier. In one or more embodiments, if the classification performed by the monitor agent using rules produced a result with a probability of 100%, then the ML classifier may not perform additional classification, as the intent of the data is already known. In one or more embodiments, if the classification result produced by the monitor agent using the rules is less than 100% certain of the intent of the data, then the ML classifier uses the information provided by the monitor agent to produce a classification result indicating the primary intent of the data.

In one or more embodiments, once the information associated with the data has been obtained, and the intent has been obtained, the monitor agent generates a global name to associate with the data, as well as a set of metadata. In one or more embodiments, the global name associated with the data by the monitor agent, is a name that is different from the public name given to the data by the application that wrote the data, and has semantic meaning, and is globally unique. In one or more embodiments, portions of the global name that convey semantic meaning may include, but are not limited to, a sequence number uniquely identifying the particular instance of the data, an identifier of the entity that produced the data, an identifier of the location of the data in the storage (e.g., a geotag), an identifier of the physical location of the host, a timestamp, and/or any other semantic information.

In one or more embodiments, the global name and metadata are stored locally with the data, and published to a global name repository. In one or more embodiments, the global name repository may be searched by other entities (e.g., computing devices) in the device ecosystem for any purpose. For example, data items having certain characteristics may be searched for and produced as a result of the search (e.g., all data produced from an autonomous vehicle in a specific geographic region during a given time window). As another example, the data that has certain characteristics may be identified so that it may be obtained for analysis by a device outside the planned workflow using the data.

In one or more embodiments, the global name and metadata are additionally provided to a services management application, which determines what services to perform on the data based at least in part on the global name and metadata, including the intent of the data. Such services may include, but are not limited to, data compression, data encryption, data priority, urgency of data processing, whether data can be transformed while in transit between devices, data content obfuscation, data transformation, data annotation, data security services, data copy protection, secure data deletion services, etc.

In one or more embodiments of the invention, a global application scheduler operatively connected to the devices in a device ecosystem receives an application manifest that specifies deploying one or more applications across the device ecosystem. The application manifest may include data descriptors relating to datasets to be used by the applications during deployment. The data descriptors may be used to determine the devices to execute the one or more applications. In this manner, the applications may be deployed based primarily on the data used by the applications. For example, an application may be determined to be deployed in a device that is operatively connected to a second device that stores a dataset that the application intends to use.

Following the determination of the deployment of the applications, the global application scheduler may send application deployment information to each device (e.g., data hosts) that are to deploy any of the one or more applications. The data hosts may initiate the deployment of their respective application(s). Further, an application controller of each data host may obtain the data descriptors and implement a data policy to determine a data placement for the dataset(s) to be used by each application deployed in the data host. A data placement may refer to an action that results in enabling access of the application to a dataset. The data placement may specify, for example, initiating a transfer of the dataset to storage of the data host. In this manner, the dataset is more accessible to the application. The data placement may be executed by a data management agent.

The data placement may result in a need to update the global name associated with the dataset to maintain consistency of the global name repository in relation to the data in the device ecosystem. The data management agent, or any entity of the data host, may perform the update of the global name.

Figure 1:
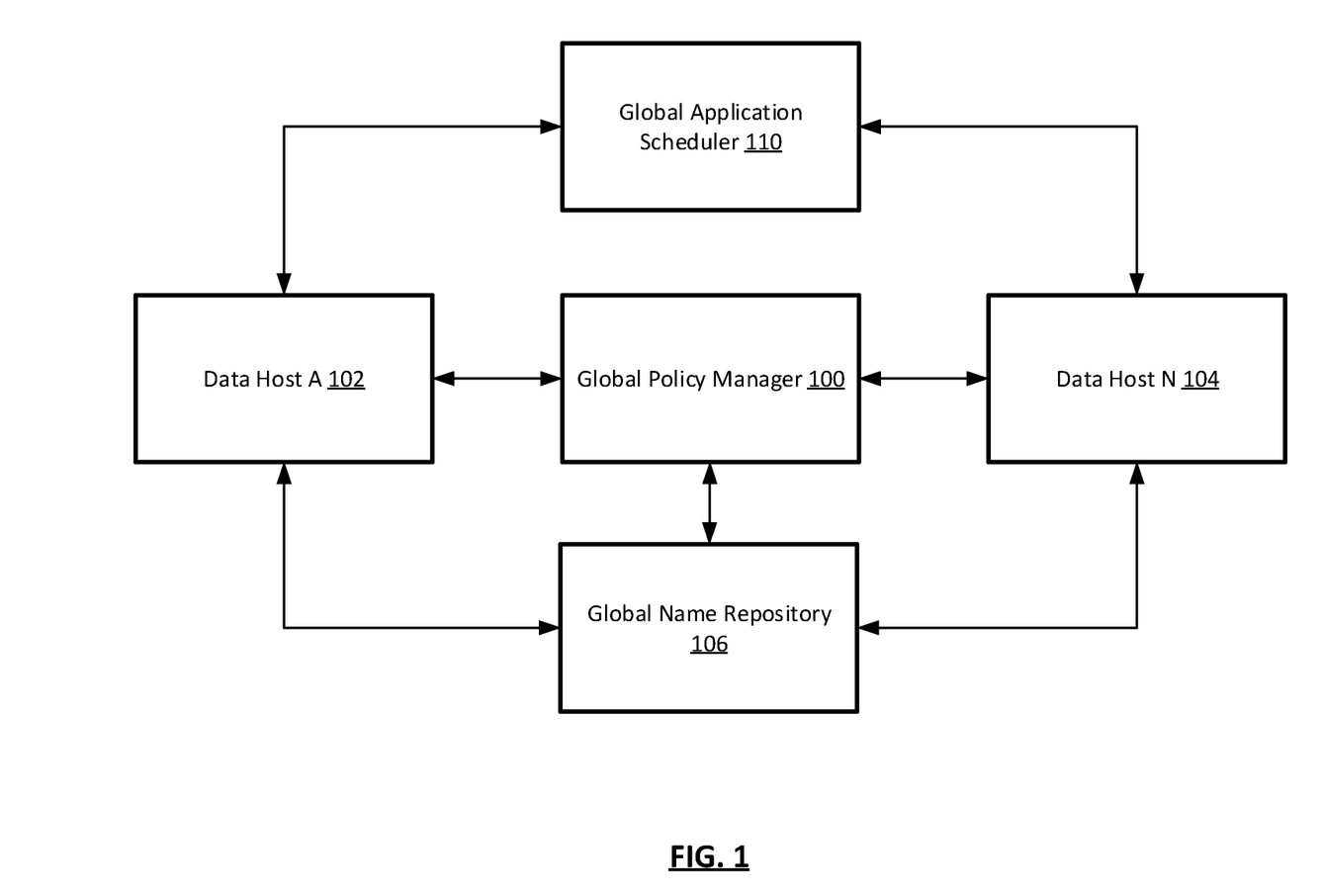
FIG. 1 shows a diagram of a system in accordance with one or more embodiments of the invention.

FIG. 1 shows a diagram of a system in accordance with one or more embodiments described herein. The system may include a global policy manager (100), a global application scheduler (110), any number of data hosts (e.g., data host A (102), data host N (104)), and a global name repository (106). Each of these components is described below.

In one or more embodiments, all of the devices shown in FIG. 1 are part of and/or operatively connected to a device ecosystem. In one or more embodiments, a device ecosystem may be a hierarchy of ecosystem portions. As an example, a device ecosystem may include a client portion, an edge portion, a core portion, and a cloud portion. A device ecosystem is not limited such an example arrangement shown in FIG. 1. A device ecosystem may have any number of client portions, each operatively connected to any number of edge portions, which may, in turn, be operatively connected to any number of core portions, which may, in turn, be connected to one or more cloud portions. One of ordinary skill in the art will recognize that there are many possible arrangements of a device ecosystem other than the example hierarchy shown in FIG. 1. In one or more embodiments, each of the devices shown in FIG. 1 may exist anywhere in a device ecosystem. As an example, the data hosts (102, 104) may exist in the client and/or edge portions of the device ecosystem, and the global policy manager (100) and global name repository (106) may exist in a core and/or cloud portion (e.g., in a data center).

In one or more embodiments, global policy manager (100) is all or any portion of a computing device. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), a controller, a sensor, and/or any other type of device with the aforementioned requirements.

In one or more embodiments, any or all of the aforementioned examples may be combined to create a system of such devices. Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, such computing devices in a device ecosystem may be operatively connected to other computing devices in any way, thereby creating any topology of computing devices. Such operative connections may be all or part of a network (not shown). A network may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

In one or more embodiments, a network may include any number of devices, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, a computing device may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested.

In one or more embodiments, a global policy manager (100) includes functionality to provide rules, classifiers, and information related to data services to distributed monitor agents (not shown) executing on data hosts (102, 104). In one or more embodiments, rules may be any information item that a monitor agent (not shown) of a data host (102, 104) may use when attempting to identify the intent (e.g., purpose) of data written on a data host (102, 104). Such rules may correlate various intent possibilities with information items that include, but are not limited to, the application that writes the data, the type of data, the environment in which the data was produced, etc. In one or more embodiments, a classifier is an ML classifier that is trained prior to distribution to the data hosts (102, 104) to classify the primary intent of a given data item. There may be any number of ML classifiers, each trained for a different context such as, for example, a factory or manufacturing facility, an autonomous vehicle, a specific type of location (e.g., an airport), etc. In one or more embodiments, the global policy manager (100) distributes one or more ML classifiers to data hosts that are relevant to the context in which the data host exists. As an example, an ML classifier may be a multiclass support vector machine (SVM). Other ML classifiers may be used without departing from the scope of embodiments described herein. In one or more embodiments, information related to data services may include additional rules that, when evaluated by a services management application executing on the data host, determine what data services should be applied to data, based at least in part on the global name and metadata associated with the data and generated by the monitor agent.

In one or more embodiments, the global policy manager (100) is operatively connected to any number of data hosts (102, 104). In one or more embodiments, a data host (102, 104) is a computing device (described above). In one or more embodiments, a data host (102, 104) is any computing device where data is written to storage of any type. Data hosts are discussed further in the description of FIG. 2, below.

In one or more embodiments, the global policy manager (100) and the data hosts (102, 104) are operatively connected (e.g., via a network) to a global name repository (106). In one or more embodiments, a global name repository (106) is a data structure of any type that may store global names and metadata associated with data written on data hosts (102, 104). Although FIG. 1 shows the global name repository (106) as a single device, the global name repository (106) may be a data structure distributed among any number of devices without departing from the scope of embodiments described herein. In one or more embodiments, the global data repository is accessible to entities interested in data produced and stored on data hosts (102, 104) within a device ecosystem, such as, for example, other devices within the device ecosystem, administrators, etc. In one or more embodiments, the global name repository is implemented using any number of computing devices.

In one or more embodiments of the invention, the global application scheduler (110) functions as a distributed service for deploying workflows within a device ecosystem. In one or more embodiments, the global application scheduler (110) receives, from operatively connected data hosts (102, 104), information about what capabilities the data hosts (102, 104) can perform, how much capacity is available on the data hosts, an occupancy of workflows (or workflow portions) currently executing on the data hosts (102, 104), and/or any other information or metadata that may be useful to determine whether a portion of a workflow should be or can be provisioned within a given domain.

In one or more embodiments of the invention, the global application scheduler (110) may use the obtained information and/or metadata to allocate applications (e.g., workflow portions) to the data hosts based on application manifests obtained that specify the provisioning of the data hosts to execute the applications of a workflow. The allocation of the applications on the data hosts (102, 104) may further depend on the data to be used by the applications. The data may be specified in the application manifest as data descriptors. The various actions performed by the global application scheduler (110) are discussed further in the description of FIG. 3B, below.

In one or more embodiments, the global application scheduler (110) is all or any portion of a computing device. In one or more embodiments, a computing device is any device, portion of a device, or any set of devices capable of electronically processing instructions and may include any number of components, which include, but are not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

While FIG. 1 shows a configuration of components, other configurations may be used without departing from the scope of embodiments described herein. Accordingly, embodiments disclosed herein should not be limited to the configuration of components shown in FIG. 1.

Figure 2:
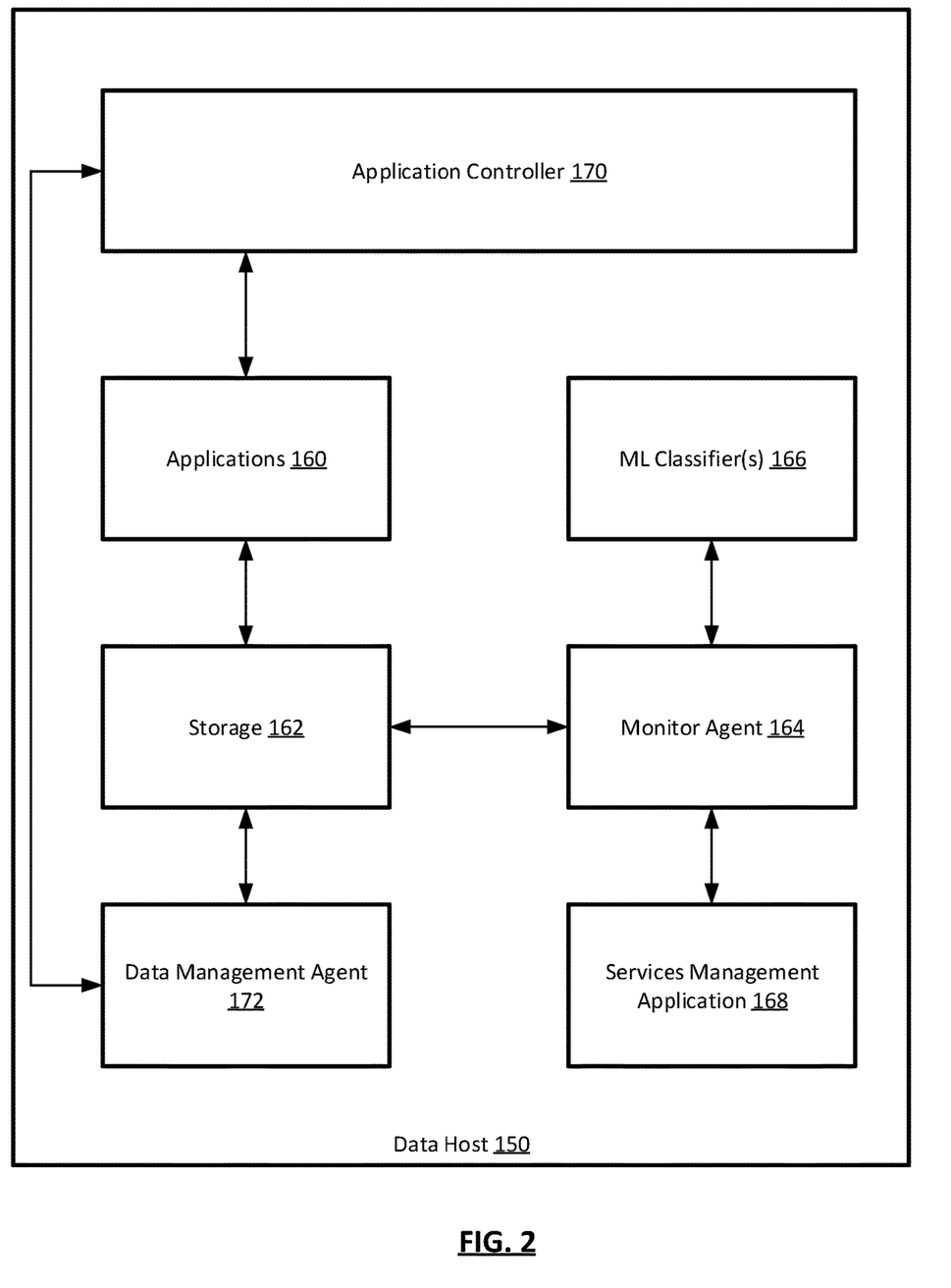
FIG. 2 shows a diagram of a system in accordance with one or more embodiments of the invention.

FIG. 2 shows a diagram of an example data host in accordance with one or more embodiments described herein. The data host (150) may include applications (160), storage (162), a monitor agent (164), any number of ML classifier(s) (166), and a services management application (168). Each of these components is described below.

In one or more embodiments, there are any number of applications (160) executing on a data host (150). In one or more embodiments, an application is any hardware (e.g., circuitry), software, firmware, or any combination thereof that includes functionality to write data to the storage (162) of a data host (150). As used herein, application may refer to any process, thread, software, firmware, writer, etc. that writes data to the storage (162) of a data host (150). As an example, an application may execute and have an associated process identifier, and, when the application is writing data, the process identifier may be obtained as associated with the data as it is being written. An application may execute to achieve any purpose without departing from the scope of embodiments herein. Examples include, but are not limited to, an application that controls one or more sensors and writes to the storage the data obtained therefrom; an application that gathers and writes data for use in machine learning training, validation, or execution; an application that monitors physical processes to perform anomaly detection, an application that analyzes images, an application that monitors equipment for signs of possible failure, etc. In one or more embodiments, applications (160) of data host (150) are operatively connected to storage (162) in which the applications (160) store data.

In one or more embodiments, data host (150) includes and/or is operatively connected to storage (162). In one or more embodiments, storage (162) is any type of physical medium for storing data in which one or more data structures of any type are implemented to organize the stored data. Examples of such data structures include, but are not limited to, a file system, object store, data streams, key-value databases, etc. In one or more embodiments, the storage (162) may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, the storage (162) of data host (150) is operatively connected to a monitor agent (164). In one or more embodiments, a monitor agent is an instance of a distributed agent. In one or more embodiments, data host (150) includes any number of agents (e.g., monitor agent (164)). In one or more embodiments, an agent is any hardware (e.g., circuitry), software, firmware, or any combination thereof that includes functionality to perform any tasks or actions for which it was designed. Examples of agent functionality include, but are not limited to: monitoring hardware; monitoring other software; monitoring log files; receiving information; parsing information; writing information (e.g., to hardware tables); performing repetitive tasks (e.g., data backup, memory management, etc.); providing an environment for a user to interact, locally or remotely, with hardware and/or software components of a computing device; automatically adding data to certain types of fields; performing management functions; simulating other software and/or hardware; sending an/or receiving signals (e.g., beacon signals) to determine if a device still has an operative connection with another device; any other task or action; or any combination thereof. An agent may be a process, or a part of a process, may include one or more threads within one or more processes, and/or may be capable of creating additional threads. In one or more embodiments, an agent executes within an operating system (not shown) using one or more processors (not shown) of data host (150).

In one or more embodiments, a monitor agent (164) includes functionality to monitor whatever one or more data structures are implemented in storage (162) to ascertain when data is written thereto. As an example, the monitor agent (164) may monitor a file system in the storage (162) to determine when new files are written. In one or more embodiments, when a monitor agent (164) determines that data is written to a data structure in the storage (162), the determination serves as a trigger for the monitor agent to perform a variety of actions relating to obtaining information about the data, and classifying the intent of the data. The various actions performed by monitor agent (164) are discussed further in the description of FIG. 3A, below.

In one or more embodiments, the monitor agent (164) is operatively connected to a global policy manager (e.g., global policy manager (100) of FIG. 1). In one or more embodiments, the global policy manager distributes to each distributed monitor agent instance in a device ecosystem (including monitor agent (164)) policy rules and one or more ML classifiers (166).

In one or more embodiments, the policy rules are a set of rules for the monitor agent (164) to evaluate when trying to determine information about data that is written to storage (162), including the intent of the data. As an example, a rule may indicate that data written by a particular application always has a particular intent, has two or more possible intents, etc. As another example, a rule may include that when a particular application writes data of a particular type, the data has a certain intent. Any other rule may be provided to the monitor agent (164) by a global policy manager without departing from the scope of embodiments described herein.

In one or more embodiments, the one or more ML classifiers (166) distributed to the monitor agent (164) from a global policy manager may be any type of ML classifier capable of taking as input information related to data that the monitor agent (164) determined was written to storage (162), and producing as output a primary intent (i.e., intended use) of the data. In one or more embodiments, the ML classifier(s) (166) are software to be executed using one or more processors, including circuitry, of data host (150). In one or more embodiments, the ML classifier(s) (166) distributed to a monitor agent (164) on a given data host (e.g., data host (150)) are a set of ML classifiers that have been trained (e.g., using other devices in a device ecosystem) using data relevant to the context in which the data host exists. Examples of such contexts include, but are not limited to, retail establishments, manufacturing facilities, transportation hubs, telecommunications companies, autonomous vehicles, etc. In one or more embodiments, ML classifiers trained using data relevant to a particular context in which a data host exists helps facilitate classification of the intent of data written on said data host. In one or more embodiments, the ML classifier(s) (166) are operatively connected to the monitor agent (164), which invokes the appropriate ML classifier when attempting to determine the intent of data that is written to the storage (162) of the data host (150). In one or more embodiments, as discussed above, the ML classifier(s) may be multiclass SVMs. In one or more embodiments, a SVM is a supervised learning model that analyzes input data to produce a classification result. In one or more embodiments, multiclass SVMs are SVMs that produce classification results when there are more than two possible classes.

In one or more embodiments, the monitor agent (164) includes functionality to, after determining that data is written to a data structure in storage (162) of data host (150), (i) obtain and/or generate metadata corresponding to the data; (ii) classify the intent of the data, with intent becoming part of the metadata; (iii) generate a global name for the metadata, the global name having any amount of semantic meaning; (iv) store the global name and metadata locally associated with the data from which the global name and metadata were derived; (v) publish the global name and metadata to a global name repository (e.g., global name repository (106) of FIG. 1); and (vi) provide the global name, metadata, and any other relevant information to a services management application (168).

In one or more embodiments, the global name generated for a given data item by monitor agent (164) includes information for conveying semantic meaning that is to be understood in the context of the device ecosystem in which the data is generated. Examples of such semantic meanings include, but are not limited to: an identifier of the producer of the data (e.g., the Vehicle Identification Number (VIN) of an autonomous vehicle), where the information was produced (e.g., a geotag), a sequence number to uniquely identify the particular instance of the data, the name of the application that wrote the data, a timestamp, and/or any other semantic information. In one or more embodiments, the global name for a given data item generated by the monitor agent (164), may be generated pursuant to policy rules that are distributed to the monitor agent (164) from a global policy manager.

In one or more embodiments, metadata that the monitor agent (164) may generate or otherwise obtain for data written to storage (162) of a data host (150) may include any type of metadata related to the data, from any source. The following are examples of metadata generated, or obtained by, the monitor agent (164) for a given data item written to storage (162) of data host (150):

A public name, which may be the name given to the data by the application that writes the data, may have meaning to the application and to other entities within a workflow that may consume or otherwise use the data. In one or more embodiments, the public name is obtained from the application that writes the data.

A global name, described above, which is generated by the monitor agent (164) based on policy rules and includes semantic information related to the data.

A source lineage, which may be the public name of the predecessor/lineage of data/parent data global name. In one or more embodiments, the source lineage is derived from the application that writes the data.

A signature, which may be a hash value to track changes or data corruption, and may be obtained based on policy rules.

A signature type, which may be the scheme used to create the aforementioned signature, and may be obtained using policy rules.

An application name, which may be the name of the application that produced and/or wrote the data.

A time value, which may be, for example, the universal coordinated time (UTC) of when the writing of the data is completed.

A data source classification, which may be the actual source of the data (e.g., machine generated, camera, RADAR, LIDAR, ultrasonic sensors, audio sensors, application generated (e.g., file, object, stream, segment, time series, etc.), etc.). In one or more embodiments, the data source classification is obtained by the monitor agent's application of policy rules and/or as a result of an ML classifier.

A version or sequence number associated with the data, which may be assigned based on policy rules.

A data type, which may be unstructured data (e.g., video, image, audio, point cloud, etc.) or structured data (e.g., structured binary, asci, executable, etc.). In one or more embodiments, the data type may be obtained from the application that wrote the data and/or as a result of the application of policy rules or the result of an ML classifier.

A data size, which may be the size of the data in a relevant unit, such as, for example, bytes. In one or more embodiments, the data size is obtained by inspecting the data, and the unit is determined by policy rules provided to the monitor agent (164).

Segment information, which may include file segment size, number of segments in the data, etc.

Intent, which may be the intended use of the data. Examples of such uses include, but are not limited to, training, mapping, process control, compliance, diagnostics, lawful intercept, entertainment, manifest, etc. Intent may be obtained from the application that wrote the data (e.g., via an API), determined from the application of policy rules by the monitor agent (164), and/or determined as a result of an ML classifier.

Data reduction information, which may include whether the data is lossy, lossless, has copy protection, is compressed, etc.;

Data reduction type information, which may include the actual compression applied to the data;

Encryption information, which may include whether or not the data is encrypted and, if so, what type of encryption was used to encrypt the data;

Sensitivity information, which may include the level of sensitivity of the data which defines level of security (e.g., sign only, sign/encrypt, anonymize, etc.);

Target storage tier information, which may include, for example, in memory, online, active archive, inactive archive, no retention, etc.;

Retention period information, which may include a value representing a time period (e.g., number of days) for which the data is to be retained;

Location information, which may include the geographic information of where the data was written and/or the data host in which the data is stored;

Priority information, which may include a priority level associated with the data, which may impact the urgency with which the data should be processed;

A time to live (TLV) value associated with the data;

A value level, which may indicate an economic value assessment of the data, and may be provided by the application that wrote the data or derived as a result of an ML classifier; and/or Content information, which may include, for example, annotations related to the data, structured content, etc.

Other types of information may be generated or obtained as metadata by the monitor agent (164) without departing from the scope of embodiments described herein. Additionally, all or any portion of such metadata may be generated or obtained for a given data item.

In one or more embodiments, the monitor agent (164) is operatively connected to a services management application (168). In one or more embodiments, a services management application is any hardware (e.g., circuitry), software, firmware, or any combination thereof, that includes functionality to determine what services to apply to data written on a data host (150) based at least in part on the global name and metadata associated with the data and provided to the services management application (168) by the monitor agent (164). Such services may include, but are not limited to, data compression, data encryption, data priority, urgency of data processing, whether data can be transformed while in transit between devices, data content obfuscation, data transformation, data annotation, data security services, data copy protection, secure data deletion services, etc. In one or more embodiments, the determination of what services should be applied for data is determined, at least in part, by evaluation of one or more rules provided by a global policy manager in a device ecosystem.

In one or more embodiments, determining which services to apply to data is expectation based. In one or more embodiments, the application produces data with certain expectation of use. In one or more embodiments, the services management application (168) will receive expectation-related information from the monitor agent (164). Said another way, in one or more embodiments, semantic understanding of the data is established by the monitor agent (164) and passed to the services management application (168). In one or more embodiments, understanding intent (i.e., expectation), the services management application (168) may select an appropriate policy that would apply, which provides a list of prioritized data services that are appropriate for the intent associated with the data. In one or more embodiments, obtaining such a list of services takes into the account the semantic information, and may also be derived based on context. In one or more embodiments, once an optimal policy has been determined, services are selected based on acceptable resource budget and service level objective (SLO), and then applied. In one or more embodiments, after applying services for the data, the metadata corresponding to the data may be updated. As an example, if the service performed encrypts the data, the metadata may be updated to reflect that the data is encrypted and what type of encryption was used.

In one or more embodiments of the invention, the data host (150) also includes an application controller (170). In one or more embodiments of the invention, the application controller (170) is a computing device (described above), or any portion of any computing device. In one or more embodiments of the invention, the application controller (170) executes as a service. In one or more embodiments of the invention, the application controller (170) includes functionality to initiate deployment of any of the applications (160) in the data host (150). The application controller (170) may initiate the deployment of the applications based on application deployment information obtained from the global application scheduler (110, FIG. 1) discussed above.

In one or more embodiments of the invention, the application controller (170) utilizes the functionality of a data management agent (172) to perform a data placement. In one or more embodiments of the invention, a data placement refers to an action that results in allowing access to datasets by the applications (160). Such actions may include, for example, transferring the dataset from a second data host to the storage (162) of the data host (150) of FIG. 2, transferring a portion of the dataset from the second data host to the storage (162) of the data host (150), and generating a symbolic link (e.g., a hyperlink) that is provided to the application. Other actions may be performed to perform the data placement without departing from the invention.

In one or more embodiments of the invention, the data management agent (172) is any hardware (e.g., circuitry), software, firmware, or any combination thereof, that includes functionality for performing a data placement as discussed above. The data management agent (172) may be operatively connected to other data hosts that store datasets to be transferred to the data host (150). Further, the data placement agent (172) may access the global name repository (106, FIG. 1) discussed above.

While FIG. 2 shows a configuration of components, other configurations may be used without departing from the scope of embodiments described herein. Accordingly, embodiments disclosed herein should not be limited to the configuration of components shown in FIG. 2.

Figure 3A:
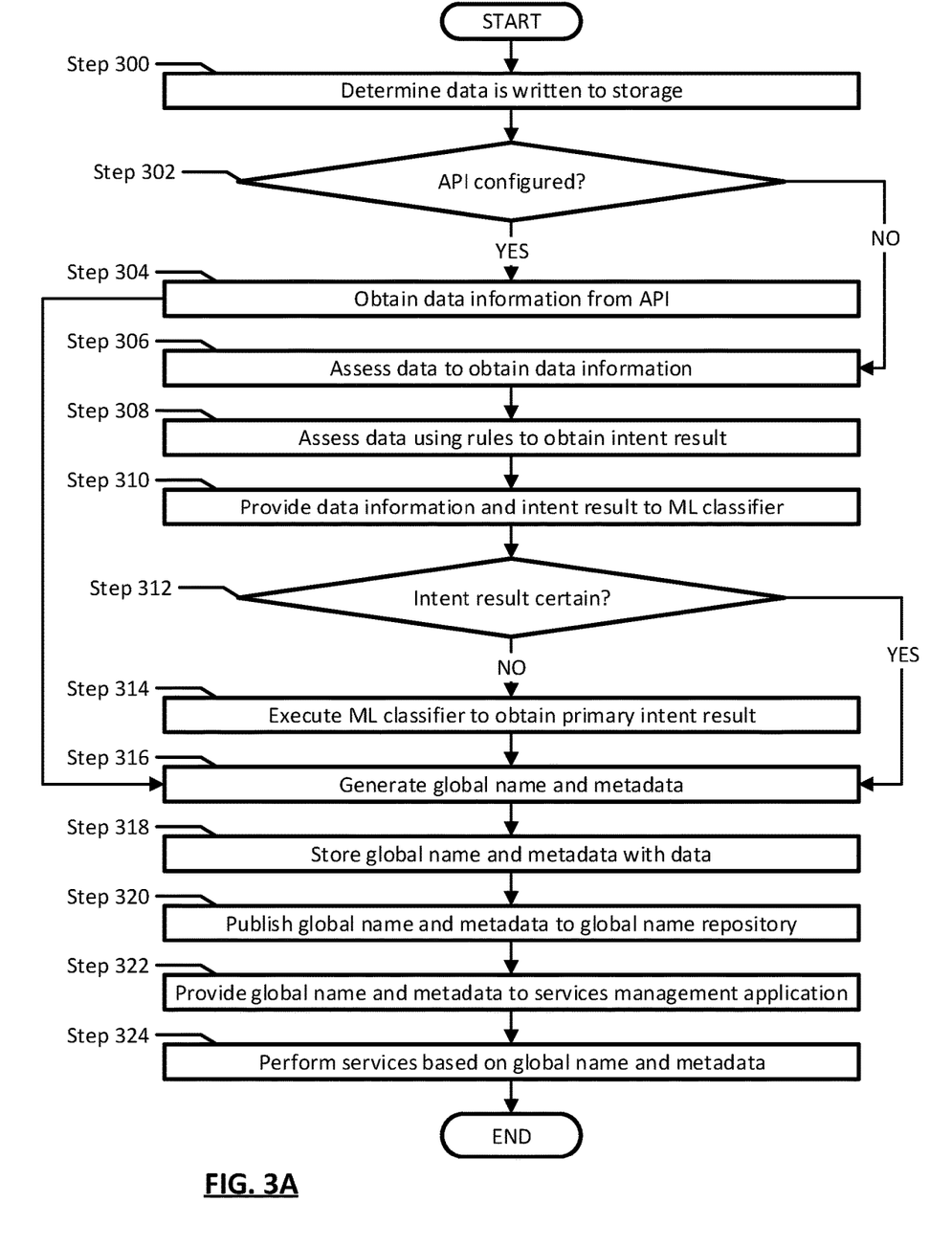
FIG. 3A shows a flowchart in accordance with one or more embodiments of the invention.

FIG. 3A shows a flowchart describing a method for applying data management techniques using a distributed monitor agent, and using the results to determine what services to apply to data in accordance with one or more embodiments disclosed herein.

While the various steps in the flowchart shown in FIG. 3A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Turning to FIG. 3A, in Step 300, a determination is made that data is written to a data structure in storage of a data host. In one or more embodiments, the determination is made by a monitor agent executing on the data host. In one or more embodiments, the monitor agent monitors one or more data structures on the data host. As an example, the data structure may be a file system. In such an example, the monitor agent may capture that the file system is accessed, the file is opened, the data is being written, the process identifier of the application that writes the data, the application associated with the process identifier, whether the data is encrypted, whether the data is compressed, what type of data it is, and/or any other relevant information related to the data.

In Step 302, a determination is made as to whether an API is configured. In one or more embodiments, an application may register to use an API to interact with the monitor agent. In such scenarios, in one or more embodiments, the application when writing the data, may use the API to provide information to the monitor agent about the data, including the intent of the data. In one or more embodiments, if such an API is configured, the method proceeds to Step 304. In one or more embodiments, if such an API is not configured, the method proceeds to Step 306.

In Step 304, data information (i.e., information related to the data being written) is obtained by the monitor agent via the API from the application that writes the data. In one or more embodiments, after Step 304, the method proceeds to Step 316.

In Step 306, the monitor agent assesses the data to obtain data information, such as the application that wrote the data, the process identifier of the application, the data type, the environment in which the data was produced, etc.

In Step 308, the monitor agent evaluates any number of rules, provided by a global policy manager, to attempt to classify the intent of the data. In one or more embodiments, the monitor agent is able to produce a result of the intent with a probability of 100%. In other cases, the monitor agent may produce a probability ranking of several possible intents. In still other cases, the monitor agent may not be able to classify the data intent using the rules (i.e., possible intents based on the rules may be 0%).

In Step 310, information related to the data obtained in Step 306, and the results of the intent analysis of Step 308 are provided to an ML classifier. Such information may be provided to the ML classifier using any means of conveying information within a computing device (e.g., inter-process communication).

In Step 312, a determination is made as to whether the results of the rules-based intent analysis of Step 308 produced a certain result (i.e., a result with a probability of 100%). In one or more embodiments, if the intent result is certain, the method proceeds to Step 316. In one or more embodiments, if the rules-based intent result is not certain, the method proceeds to Step 314.

In Step 314, the ML classifier uses the information and/or the rules-based intent analysis as input to produce a result of the primary intent classification for the data.

In Step 316, the monitor agent generates a global name and metadata for the data. In one or more embodiments, the global name is generated based on information obtained about the data, the results of the intent analysis, and policy rules related to global naming received from a global policy manager. In one or more embodiments, the metadata is either obtained or generated, as discussed above in the description of FIG. 2.

In Step 318, the global name and metadata created in Step 316 are stored locally on the data host associated with the data from which it was derived.

In Step 320, the global name and metadata are published by the monitor agent to a global name repository. In one or more embodiments, the global name and metadata are published to the global name repository using any technique for transmitting data (e.g., over a network).

In Step 322, the global name and metadata are provided by the monitor agent to a services management application. In one or more embodiments, the global name and metadata are provided to the services management application using any scheme for sharing information between applications executing on a data host (e.g., providing a location in storage where the information may be found).

In Step 324, the services management application uses the global name and the metadata associated with the data to determine what data services to apply to the data.

One example of selecting services to apply to data relates to intelligent connected vehicles. In one or more embodiments, autonomous and connected vehicles produce vast amounts of data from highly specialized sensor systems, and require life safety functions to operate per safety guidelines. In one or more embodiments, data services and prioritized execution are tightly linked, as certain data produced must be moved with urgency over communications link with potentially limited bandwidth. In one or more embodiments, context understanding coupled with expectation based methodology is key for solving this challenge. In one or more embodiments, environmental understanding (e.g., limited bandwidth) with expectation (e.g., ten second data round trip is needed) is important for selecting appropriate data services to compress the data to meet available bandwidth resources, to generate metadata modifications, and to queue the data for transport.

Another example of selecting services to apply to data relates to remote healthcare. In one or more embodiments, clinical healthcare produces highly sensitive data on patients, as well as financial and insurance information and other sensitive information. In one or more embodiments, this information needs to be shared with a high degree of security and data governance based on patient consent regulatory frameworks. Additionally, a high degree of anonymization may be used so that overall patient confidentiality is protected. However, statistical healthcare studies can be pursued to benefit many individuals (e.g., other than the patient). In one or more embodiments, selection and communication of data services for encryption and compression are essential. Communication of data services applied are also required.

Figure 3B:
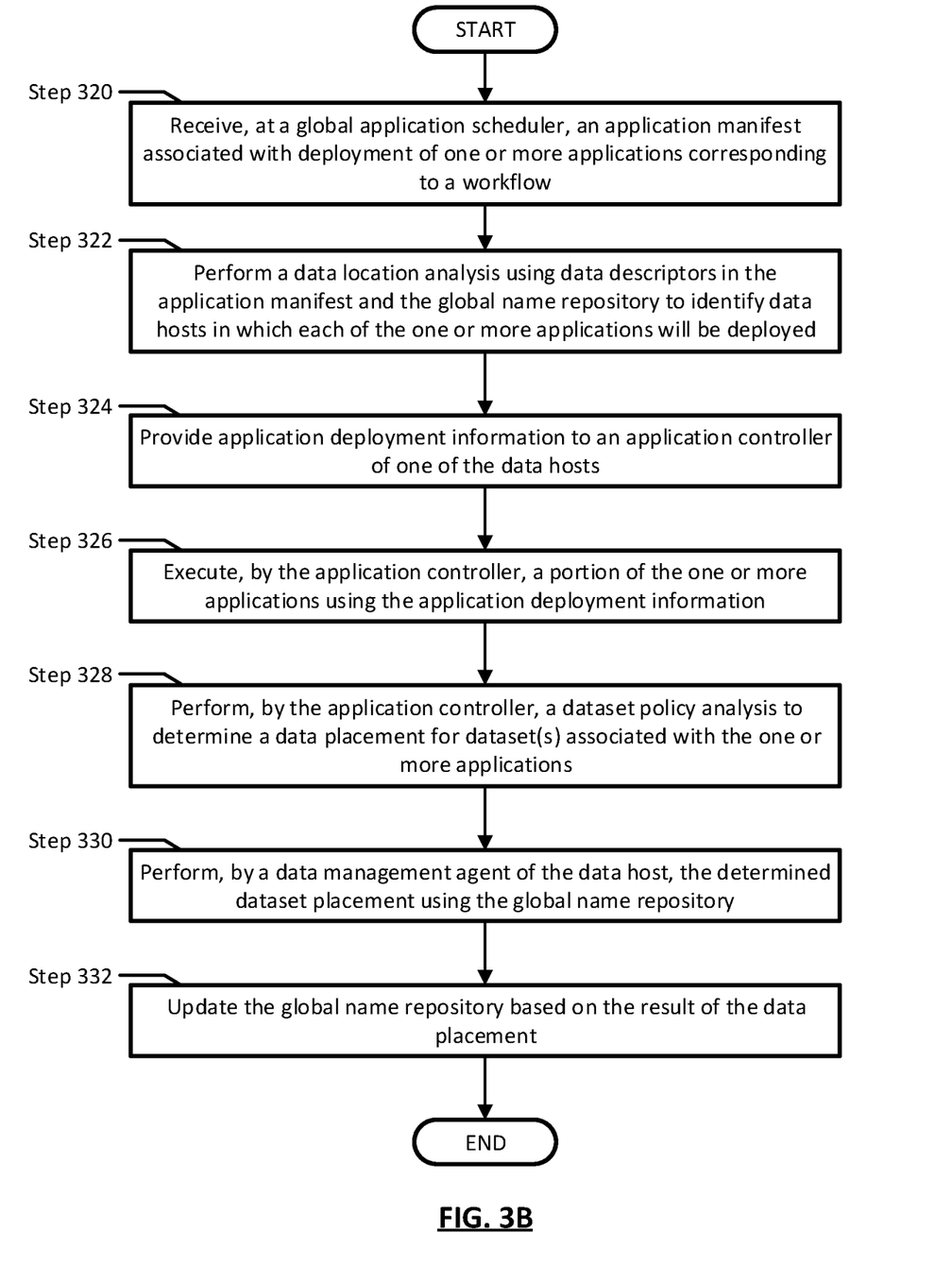
FIG. 3B shows a flowchart in accordance with accordance with one or more embodiments of the invention.

FIG. 3B shows a flowchart describing a method for deploying applications based on data descriptors and performing data management based on the application deployment in accordance with one or more embodiments disclosed herein.

While the various steps in the flowchart shown in FIG. 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 320, an application manifest is received by a global application scheduler. In one or more embodiments of the invention, the application manifest specifies a workflow to be implemented by one or more data hosts. The workflow may be a collection of applications that work interdependently to execute a desired functionality. In one or more embodiments of the invention, the application manifest conveys, at least, requirements and constraints for performing the workflow. Constraints may be based, at least in part, on an SLO associated with the workflow between the entity requesting execution of the workflow and the entity providing the ecosystem in which the workflow will be deployed. Requirements may include that the workflow will require certain amounts or types of compute resources of an ecosystem of devices, require certain data be available and/or obtained, require that certain technologies for data transfer be used (e.g., low latency network solutions), etc. For example, such requirement that certain data be available may be specified as data descriptors. The data descriptors may specify information such as, for example, the datasets to be used (e.g., using dataset identifiers), a priority of usage of each dataset by the application, whether the dataset is a time series, mount points for the datasets (e.g., for datasets that are implemented as file systems), and a list of hyperlinks to be used to access the data. Other information may be specified in the data descriptors without departing from the invention.

In one or more embodiments of the invention, the application manifest is received in the form of a YAML file that is a manifest of the interconnected services (e.g., applications) of a workflow. The application manifest may be received at a global application scheduler through any form of communicating with a computing device. For example, a user may be provided with access to a cloud console that is configured to access the global application scheduler.

In Step 322, a data location analysis is performed using data descriptors in the application manifest and the global name repository to identify data hosts in which each of the one or more applications will be deployed. In one or more embodiments of the invention, the data location analysis includes analyzing the data descriptors included in the application manifest and the capabilities of the data hosts (e.g., previously provided by the data hosts) to determine the data hosts to execute each portion of the workflow specified in the application manifest. Each portion of the workflow may include execution of one or more applications. For example, the data location analysis may determine that, based on the storage of a dataset used by a portion of the workflow, that the data host storing the dataset is to deploy an application of that portion of the workflow. The global application scheduler may use the global name repository to determine such locations of the datasets. For example, the global name repository may specify the data host that stores the data host.

In Step 324, application deployment information is provided to an application controller of one of the data hosts. The one data host may be a data host that was determined, during the data location analysis, to deploy a portion of the workflow using one or more applications. In one or more embodiments of the invention, the application deployment information includes the relevant information that is used by the application controller to install and/or otherwise deploy the application on the data host. The relevant information may include, for example, the data descriptors that specify the datasets to be used by the applications of the portion of the workflow. Further, the relevant information may include the constraints derived from the SLO corresponding to the workflow and the configuration information used to configure the data host to deploy the application. In one or more embodiments, the application deployment information is provided to the application controller using any appropriate method of data transmission. As an example, the global application scheduler may communicate the application deployment information as network data traffic units over a series of network devices that operatively connect the global application scheduler and the relevant application controller.

In Step 326, one or more applications are executed by the application controller using the application deployment information. In one or more embodiments of the invention, the one or more applications executing are the applications of the portion of the workflow the data host is to execute. The data host may use the application deployment information to initiate the deployment of the one or more applications. Following the deployment, the data hosts may provide the computing resources to execute the one or more applications.

In Step 328, a dataset policy analysis is performed by the application controller to determine a data placement for dataset(s) associated with the one or more applications. In one or more embodiments of the invention, the dataset policy analysis includes applying a data policy to each dataset specified in the data descriptors provided in the application deployment information. In one or more embodiments of the invention, the data policy specifies criteria for which the dataset is to be evaluated. The criteria may include, for example, a dataset size criterion, a network capability criterion for transferring the dataset, a latency criterion, and a data host resource criterion. In one or more embodiments of the invention, the dataset size criterion specifies a range in size of the dataset that, if met, may result in determining that the dataset may be transferred to the data host. In one or more embodiments of the invention, the network capability criterion specifies a requirement of the network capability to be met for all or a portion of the dataset to be sent. In one or more embodiments of the invention, the latency criterion specifies a latency threshold to be reached or exceeded relating to the network connectivity between the data host, and a second data host storing the dataset. In one or more embodiments of the invention, the data host resource criterion specifies a requirement of available computing resources (e.g., available storage, network bandwidth, etc.) of the data host that enables transfer of the dataset to the data host. In one or more embodiments of the invention, the data placement is determined based on whether all, or a portion, of the aforementioned criteria is met. For example, if all criteria is met, the determined data placement may specify transferring all of the dataset to the data host. As a second example, if it is determined that the dataset is a time series, and only a portion of the criteria is met, the determine data placement specifies transferring at least a portion of the dataset. The data policy analysis may be applied to each dataset to be used by the applications executing in the data host. As a third example, if the dataset is not a time series, and not all of the aforementioned criteria is met, the data placement may include providing a symbolic link to the application that enables the application to access the data from the current location. In one or more embodiments of the invention, a symbolic link refers to a data structure that specifies one or more paths that may be read from the application to access the data without requiring the transfer of the data to the storage of the data host. The data structure may include, for example, hyperlinks, file system paths, and/or any other information relating to the access of data without departing from the invention.

In Step 330, the determined dataset placement is performed using the global name repository. In one or more embodiments of the invention, the determined dataset placement is performed by a data management agent of the data host. The application controller may send a request to the data management agent that specifies the determined data placement. The request may specify the determined data placement and an identifier of each of the datasets to which the data placement applies.

In Step 332, the global name repository is updated based on the result of the data placement. In one or more embodiments of the invention, metadata of the global name repository is updated to reflect the result of the determined data placement. For example, the update may include updating each global name of the global name repository to specify the updated location information (e.g., the storage of the data host) of the dataset. As a second example, the application name may be updated to specify the application that writes the dataset. Other metadata of the global name repository may be updated without departing from the invention.

Figure 4:
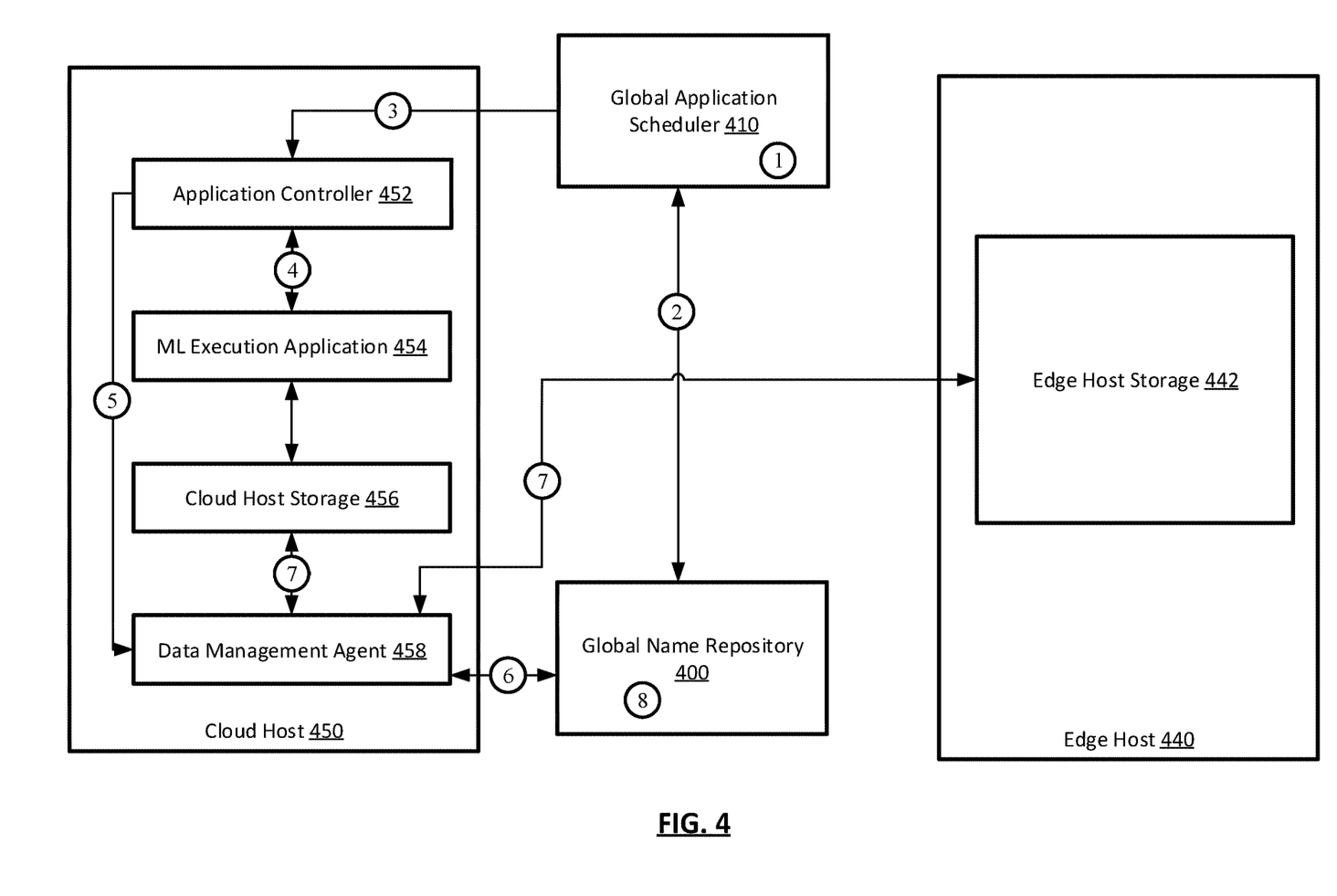
FIG. 4 shows an example in accordance with one or more embodiments of the invention.

FIG. 4 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein. One of ordinary skill will appreciate that a real-world use of embodiments described herein may use a device ecosystem organized and interconnected in any manner, and that any number of different workflows to achieve any number of different results may be deployed in such an ecosystem of devices.

Referring to FIG. 4, consider a scenario in which a workflow is to be implemented that includes implementing a machine learning (ML) execution that applies a dataset to a ML model to output a result. In this example, the workflow comprises the ML execution application. An application manifest is provided to the global application scheduler (410) from an administrative client (not shown) of the example system [1]. The global application scheduler (410) performs the method of FIG. 3B to initiate deployment of the workflow. Specifically, the global application scheduler (410) accesses the global name repository (400), to identify the data host that stores a dataset to be used by the ML execution application (454), to perform the ML execution [2]. The dataset is specified in data descriptors of the application manifest.

Using the global name repository, the global application scheduler (410) identifies edge host (440) as the data storing the dataset. The global application scheduler (410), further performs the method of FIG. 3B to perform a data location analysis that analyzes the capability of the edge host (442), and determine that the ML execution application cannot be deployed in the edge host (440), due to the computing requirements to execute such application that the edge host (440) does not meet. Further, the global application scheduler assigns a cloud host (450) to perform the ML execution application. The global application scheduler (410) provides application deployment information to an application controller (452) of the cloud host (450) to initiate execution of the ML execution application (454) [3].

The application controller (452), in response to obtaining the application deployment information, initiates execution of the ML execution application (454) on the cloud host (450) [4]. Further, the application controller (452) performs a data policy analysis to analyze the dataset specified in the application deployment information, to determine a data placement to be performed on the dataset. The data policy analysis includes determining that the dataset meets a dataset size criterion, that would enable the data placement to be a transfer to the cloud host (450). Further, a network connectivity criterion is met that specifies a sufficient network bandwidth is available for data transfer, a latency criterion is met that specifies a minimum latency in the network connection, and a data host resource criterion is met that specifies the cloud host (450) hosting sufficient storage in the cloud host storage (456) to store the dataset. Based on the data policy analysis, the data placement is determined to include transferring the dataset to the cloud host (450). Based on the data placement, a request is sent to a data management agent (458) of the cloud host (450) that specifies implementing the determined data placement [5].

The data management agent (458), in response to the request, accesses the global name repository (400) to identify the location information corresponding to the dataset [6]. After determining that the dataset is stored in storage (442) of the edge host (440), the data management agent (458) then performs the data placement, which includes transferring, via a network connectivity between the edge host (440) and the cloud host (450), the dataset from the edge host storage (442) to the cloud host storage (456) [7]. Following the data placement, the data management agent (458) updates the global name repository to specify the change in location information of the dataset.

Figure 5:
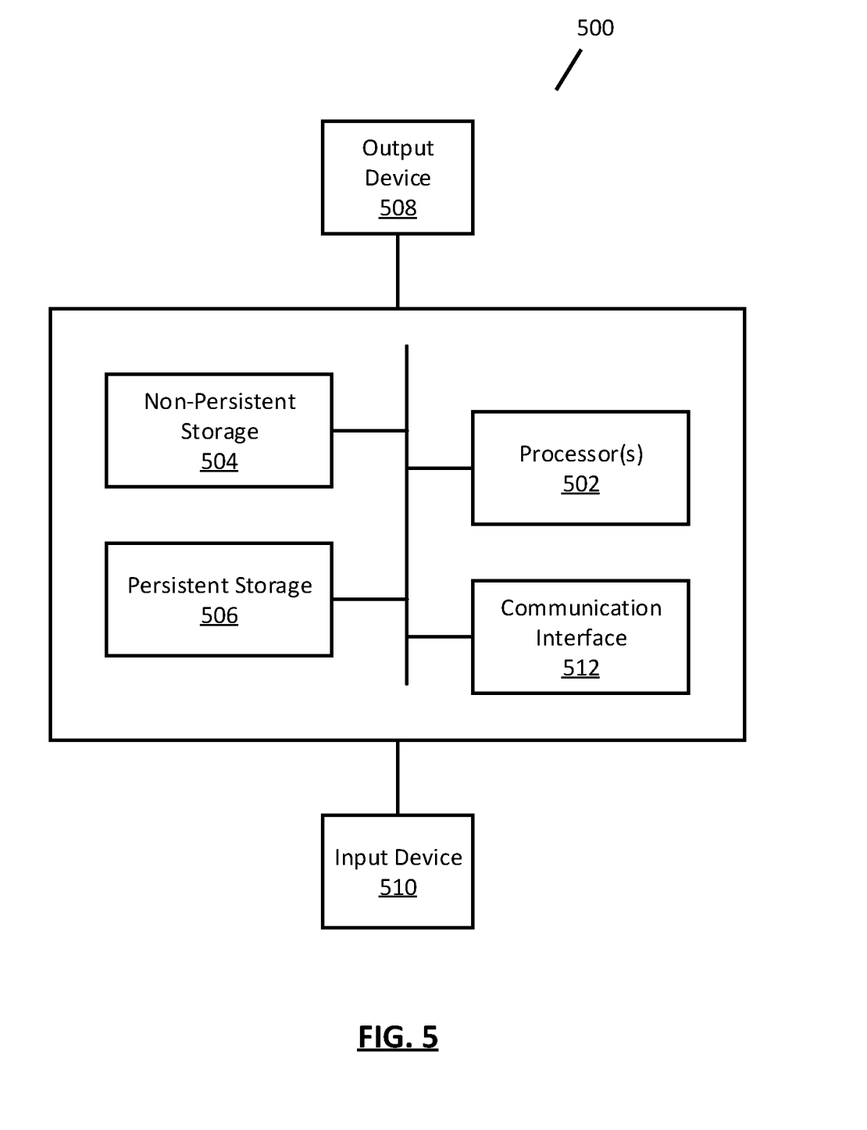
FIG. 5 shows a computing system in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disc (CD) drive or digital versatile disc (DVD) drive, a flash memory, etc.), a communication interface (512) (e.g., Bluetooth® interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for distributed data management, the method comprising:
    obtaining data descriptors for an application executing on a data host;
    performing a dataset policy analysis using the data descriptors to determine a data placement for a dataset associated with the application using a global name repository;
    performing, based on the data policy analysis, the data placement; and
    based on the data placement, updating the global name repository.

2. The method of claim 1, wherein the data descriptors comprises at least one of: a list of mount points of the dataset, a size of the dataset, a criticality of the dataset for the application, and an indication of whether the dataset is a time series.

3. The method of claim 1, wherein the data placement comprises transferring the data from a second data host to the data host.

4. The method of claim 1, wherein the data placement comprises transferring a portion of the dataset from a second host.

5. The method of claim 1, wherein the data placement comprises providing a symbolic link to the application that enables access to the dataset by the application.

6. The method of claim 1, wherein the data policy analysis comprises:
    applying a data policy to the dataset to determine the data placement,
    wherein the data policy comprises at least one of: a dataset size criterion, a network capability criterion for transferring the dataset, a latency criterion, and a data host resource criterion.

7. The method of claim 1, wherein:
    the global name repository comprises a global name associated with the dataset, and
    updating the global name repository comprises updating the global name to specify a new location of the dataset.

8. A non-transitory computer readable medium comprising computer readable program code, which when executed by a computer processor enables the computer processor to perform a method for distributed data management, the method comprising:
    obtaining data descriptors for an application executing on a data host;
    performing a dataset policy analysis using the data descriptors to determine a data placement for a dataset associated with the application using a global name repository;
    performing, based on the data policy analysis, the data placement; and
    based on the data placement, updating the global name repository.

9. The non-transitory computer readable medium of claim 8, wherein the data descriptors comprises at least one of: a list of mount points of the dataset, a size of the dataset, a criticality of the dataset for the application, and an indication of whether the dataset is a time series.

10. The non-transitory computer readable medium of claim 8, wherein the data placement comprises transferring the data from a second data host to the data host.

11. The non-transitory computer readable medium of claim 8, wherein the data placement comprises transferring a portion of the dataset from a second host.

12. The non-transitory computer readable medium of claim 8, wherein the data placement comprises providing a symbolic link to the application that enables access to the dataset by the application.

13. The non-transitory computer readable medium of claim 8, wherein the data policy analysis comprises:
    applying a data policy to the dataset to determine the data placement,
    wherein the data policy comprises at least one of: a dataset size criterion, a network capability criterion for transferring the dataset, a latency criterion, and a data host resource criterion.

14. The non-transitory computer readable medium of claim 8, wherein:
    the global name repository comprises a global name associated with the dataset, and
    updating the global name repository comprises updating the global name to specify a new location of the dataset.

15. A system for distributed data management, the system comprising:
    an application controller, executing on a processor comprising circuitry, configured to:
        make a first determination that data is written to a data structure of storage of a data host;
        obtain data descriptors for an application executing on a data host;
        perform a dataset policy analysis using the data descriptors to determine a data placement for a dataset associated with the application using a global name repository;
        initiate, based on the data policy analysis, the data placement; and
        based on the data placement, updating the global name repository.

16. The system of claim 15, wherein the data descriptors comprises at least one of: a list of mount points of the dataset, a size of the dataset, a criticality of the dataset for the application, and an indication of whether the dataset is a time series.

17. The system of claim 15, wherein the data placement comprises transferring the data from a second data host to the data host.

18. The system of claim 15, wherein the data placement comprises transferring a portion of the dataset from a second host.

19. The system of claim 15, wherein the data placement comprises providing a symbolic link to the application that enables access to the dataset by the application.

20. The system of claim 15, wherein the data policy analysis comprises:
   applying a data policy to the dataset to determine the data placement,
   wherein the data policy comprises at least one of: a dataset size criterion, a network capability criterion for transferring the dataset, a latency criterion, and a data host resource criterion.

* * * * *